US008755832B2

(12) United States Patent
Baldemair et al.

(10) Patent No.: US 8,755,832 B2
(45) Date of Patent: Jun. 17, 2014

(54) METHODS AND APPARATUSES FOR ENABLING POWER BACK-OFF INDICATION IN PHR IN A TELECOMMUNICATIONS SYSTEM

(75) Inventors: Robert Baldemair, Solna (SE); Lisa Boström, Solna (SE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 243 days.

(21) Appl. No.: 13/129,237

(22) PCT Filed: Apr. 29, 2011

(86) PCT No.: PCT/SE2011/050528
§ 371 (c)(1),
(2), (4) Date: May 13, 2011

(87) PCT Pub. No.: WO2012/091651
PCT Pub. Date: Jul. 5, 2012

(65) Prior Publication Data
US 2012/0172079 A1 Jul. 5, 2012

Related U.S. Application Data

(60) Provisional application No. 61/428,684, filed on Dec. 30, 2010.

(51) Int. Cl.
| | | |
|---|---|---|
| H04B 7/00 | (2006.01) | |
| H04W 52/36 | (2009.01) | |
| H04W 52/30 | (2009.01) | |
| H04W 52/34 | (2009.01) | |
| H04W 52/58 | (2009.01) | |
| H04W 52/14 | (2009.01) | |
| H04W 24/10 | (2009.01) | |

(52) U.S. Cl.
CPC ............ *H04W 52/365* (2013.01); *H04W 52/30* (2013.01); *H04W 52/34* (2013.01); *H04W 52/58* (2013.01); *H04W 52/146* (2013.01); *H04W 24/10* (2013.01)
USPC ............. 455/522; 455/67.11; 455/68; 455/69

(58) Field of Classification Search
CPC ... H04W 52/365; H04W 52/30; H04W 52/34; H04W 24/10; H04W 52/58; H04W 52/146
USPC .............. 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

2009/0191910 A1* 7/2009 Athalye et al. ................. 455/522
2011/0292874 A1* 12/2011 Ho et al. ........................ 370/328

OTHER PUBLICATIONS

3rd Generation Partnership Project, Source: QUALCOMM Inc., "Power Headroom Report for Rel. 10," 3GPP TSG RAN WG4 #57, R4-104779, pp. 1-4, Nov. 15-19, 2010, Jacksonville, FL, USA.
3RD Generation Partnership Project, Source: QUALCOMM, "PA Backoff in Power Headroom Reporting," 3GPP TSG-RAN WG2 meeting #46, R2-050453, pp. 1-6, Feb. 14-18, 2005, Scottsdale, AZ, USA.

\* cited by examiner

*Primary Examiner* — Dominic E Rego
(74) *Attorney, Agent, or Firm* — Coats & Bennett, PLLC

(57) ABSTRACT

The exemplary embodiments describe a method for use in a user equipment (700), a method for use in a radio base station (600); a user equipment (700) and a radio base station (600). According to the exemplary embodiments, the user equipment (700) is configured to decide on application or not of a power reduction and to indicate it decision in a power headroom report intended for transmission to the radio base station (600). The radio base station (600) is configured to receive the power headroom report and based on the indicated information in the received power headroom report, the base station in made aware of an additional or special power back-off (e.g. to fulfill SAR requirements) has been applied and thereby able to distinguish it from normal power backoff or power reduction.

32 Claims, 12 Drawing Sheets

The LTE downlink physical resource

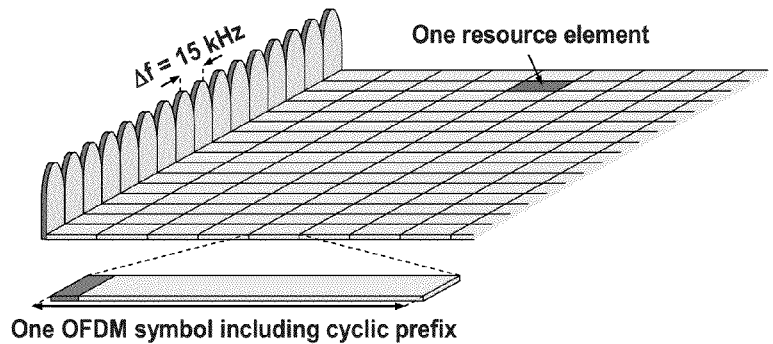
Figure 1 The LTE downlink physical resource
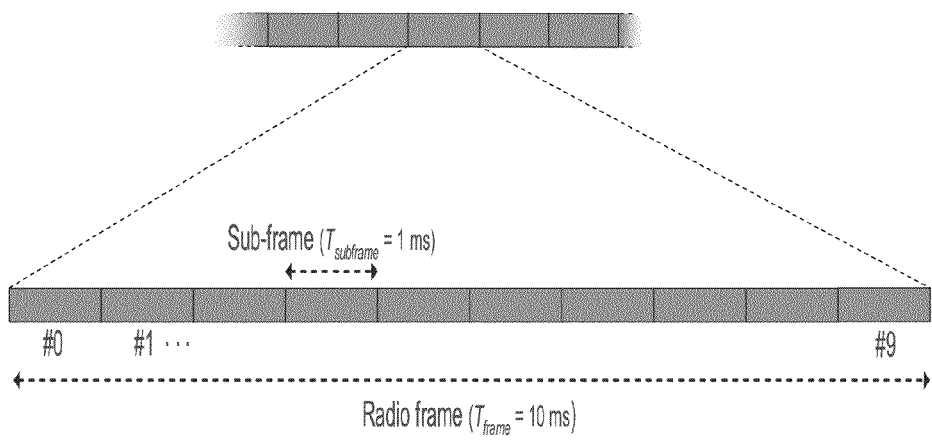
Figure 2 LTE time-domain structure

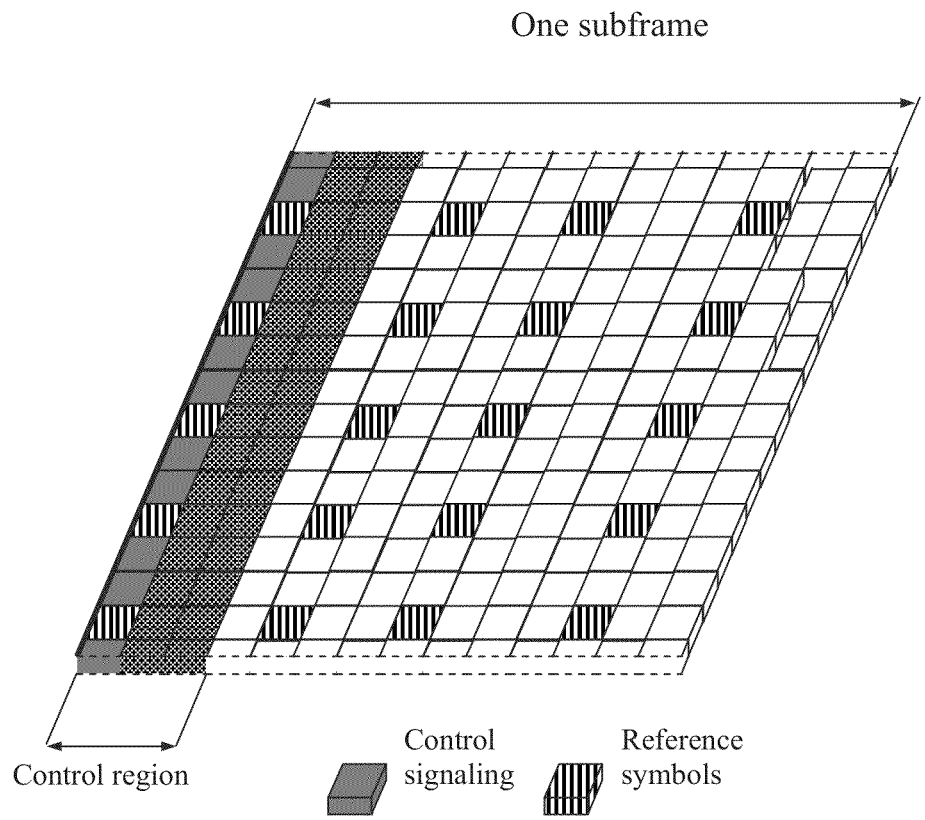
Figure 3 Downlink subframe

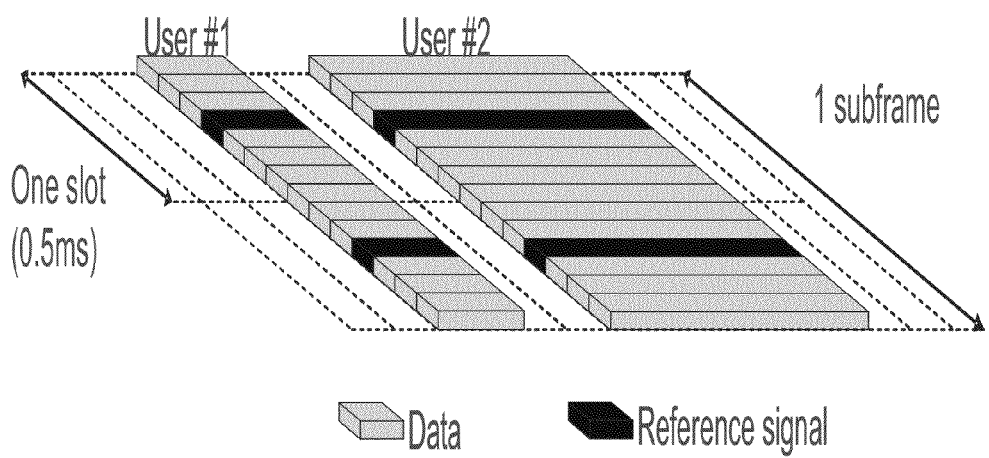
Figure 4: PUSCH resource assignment

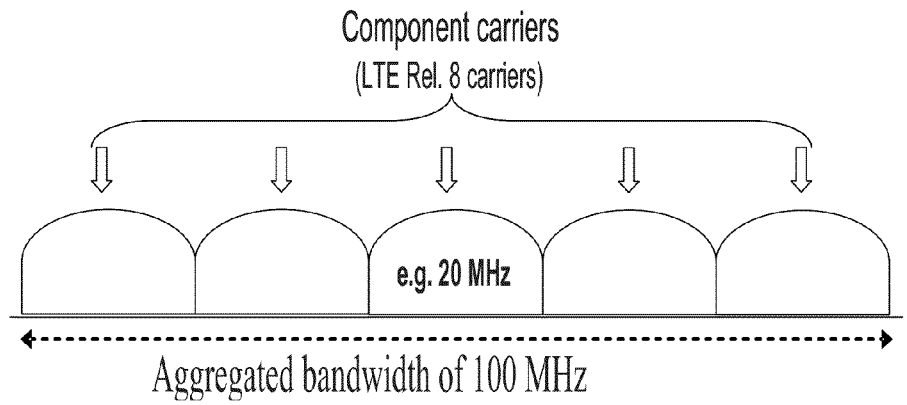
Figure 5 – Carrier Aggregation
| C₇ | C₆ | C₅ | C₄ | C₃ | C₂ | C₁ | R |
|---|---|---|---|---|---|---|---|
| R | V | \multicolumn{6}{c}{PH (Type 1, PCell)} |
| R | R | \multicolumn{6}{c}{$P_{CMAXc}$ 1} |
| R | V | \multicolumn{6}{c}{PH (Type 1, Scell 1)} |
| R | R | \multicolumn{6}{c}{$P_{CMAXc}$ 2} |
...
| R | V | PH (Type 1, Scell n) |
|---|---|---|
| R | R | $P_{CMAX,c}$ m |
Figure 6 - Extended PHR MAC CE as depicted in 3GPP TS 36.321

R/R/E/LCID sub-header

| $C_7$ | $C_6$ | $C_5$ | $C_4$ | $C_3$ | $C_2$ | $C_1$ | R |
|---|---|---|---|---|---|---|---|
| R | V | \multicolumn{6}{c}{PH (Type 1, PCell)} |
| R | P | \multicolumn{6}{c}{$P_{CMAX,c}$ 1} |
| R | V | \multicolumn{6}{c}{PH (Type 1, Scell 1)} |
| R | P | \multicolumn{6}{c}{$P_{CMAX,c}$ 2} |

...

| R | V | PH (Type 1, Scell n) |
|---|---|---|
| R | P | $P_{CMAX,c}$ m |

Figure 9

| $C_7$ | $C_6$ | $C_5$ | $C_4$ | $C_3$ | $C_2$ | $C_1$ | R |
|---|---|---|---|---|---|---|---|
| R | V | \multicolumn{6}{c}{PH (Type 1, PCell)} |
| P | T | \multicolumn{6}{c}{$P_{CMAX,c}$ 1} |
| R | V | \multicolumn{6}{c}{PH (Type 1, Scell 1)} |
| P | T | \multicolumn{6}{c}{$P_{CMAX,c}$ 2} |

...

| R | V | PH (Type 1, Scell n) |
|---|---|---|
| P | T | $P_{CMAX,c}$ m |

Figure 10

| P bit | T bit | Applied backoff |
|---|---|---|
| 0 | 0 | Backoff value 0 |
| 0 | 1 | Backoff value 1 |
| 1 | 0 | Backoff value 2 |
| 1 | 1 | Backoff value 3 |

Figure 10A

METHODS AND APPARATUSES FOR ENABLING POWER BACK-OFF INDICATION IN PHR IN A TELECOMMUNICATIONS SYSTEM

TECHNICAL FIELD

The presently described embodiments relate generally to the field of wireless telecommunications, and, more particularly, to methods and apparatuses for enabling power back-off indication in at least Power headroom reporting (PHR) in a communication system.

BACKGROUND

In a telecommunications system such as LTE (Long Term Evolution) OFDM (Orthogonal Frequency Division Multiplexing) is used in the downlink and DFT (Discrete Fourier Transform)-spread OFDM (a.k.a. Single-Carrier Frequency Division Multiple Access, SC-FDMA) in the uplink. The basic LTE downlink physical resource may thus be seen as a time-frequency grid as illustrated in FIG. 1 where each resource element corresponds to one OFDM subcarrier during one OFDM symbol interval.

In the time domain, LTE downlink transmissions are organized into radio frames of 10 ms, each radio frame comprising of ten equally-sized subframes of length $T_{subframe}=1$ ms (see FIG. 2).

Furthermore, the resource allocation in LTE is typically described in terms of resource blocks, where a resource block corresponds to one slot (0.5 ms) in the time domain and 12 subcarriers in the frequency domain. Resource blocks are numbered in the frequency domain, starting with 0 from one end of the system bandwidth.

Downlink transmissions are dynamically scheduled, i.e., in each subframe the base station transmits control information indicating to which terminals and on which resource blocks the data is transmitted during the current downlink subframe. This control signaling is typically transmitted in the first 1, 2, 3 or 4 OFDM symbols in each subframe. A downlink system with 3 OFDM symbols as control region is illustrated in FIG. 3.

LTE, a plurality of channels is defined such as the Physical Uplink Control Channel (PUCCH) and the Physical Uplink Shared Channel (PUSCH) which are described below.

For PUCCH LTE is configured to use hybrid-ARQ (hybrid Automatic Repeat request), where, after receiving downlink data in a subframe, the mobile terminal or often referred to as the User Equipment (LE) attempts to decode it and reports to the base station whether the decoding was successful Acknowledgment (ACK) or not (NACK) (Non-Acknowledgment)). In case of an unsuccessful decoding attempt, the base station may retransmit the erroneous data.

Uplink control signaling from the terminal (e.g. UE) to the base station may include:
  hybrid-ARQ acknowledgements for received downlink data;
  terminal reports related to the downlink channel conditions, used as assistance for at least the downlink scheduling (also known as Channel Quality Indicator (CQI));
  scheduling requests, indicating that the terminal needs uplink resources for uplink data transmissions.

If the mobile terminal has not been assigned an uplink resource for data transmission, the L1/L2 (Layer 1 and/or Layer 2) control information (channel-status reports, hybrid-ARQ acknowledgments, and scheduling requests) is transmitted in uplink resources (resource blocks) assigned for uplink L1/L2 control information on the PUCCH. Different PUCCH formats are used for different information. For example, PUCCH Format 1a/1b and 3 are used for hybrid-ARQ feedback, PUCCH Format 2/2a/2b for reporting of channel conditions, and PUCCH Format 1 for scheduling requests. The different PUCCH formats are described in the Third Generation Partnership Project LTE standard related Technical Specifications 3GPP TS 36.213.

To transmit data in the uplink the mobile terminal has to be assigned an uplink resource for data transmission, on the Physical Uplink Shared Channel (PUSCH), see FIG. 4.

The middle single-carrier symbol in each slot is used to transmit a reference symbol. If the mobile terminal has been assigned an uplink resource for data transmission and at the same time instance has control information to transmit, it will transmit the control information together with the data on PUSCH.

LTE Rel-8 (Release-8) has recently been standardized, supporting bandwidths up to 20 MHz. However, in order to meet the International Mobile Telecommunications Advanced (IMT-Advanced) requirements, 3GPP has initiated work on LTE Rel-10. One of the key components of LTE Rel-10 is the support of bandwidths beyond 20 MHz while ensuring backward compatibility with LTE Rel-8. This should also include spectrum compatibility and implies that an LTE Rel-10 carrier, potentially wider than 20 MHz may be realized as a number of LTE carriers to an LTE Rel-8 terminal (e.g. a UE). Each such carrier may he referred to as a Component Carrier (CC). For early LTE Rel-10 deployments it may be expected that there will be a smaller number of LTE Rel-10 capable terminals compared to many LTE legacy terminals. Therefore, it may be necessary to assure an efficient use of a wide carrier also for legacy terminals, i.e. that it is possible to implement carriers where legacy terminals may be scheduled in all parts of the wideband LTE Rel-10 carrier. A way to obtain this would be by means of Carrier Aggregation (CA) so that that an LTE Rel-10 terminal may receive multiple CCs, where a CC has, or at least have the possibility to have, the same structure as a Rel-8 carrier. CA is illustrated, in FIG. 5.

The number of aggregated CCs as well as the bandwidth of the individual CC may be different for uplink and downlink. A symmetric configuration refers to the case where the number of CCs in downlink and, uplink is the same whereas an asymmetric configuration refers to the case that the number of CCs is different. It should be noted that the number of CCs configured in a cell area may be different from the number of CCs seen or used by a terminal: A terminal may for example support more downlink CCs than uplink CCs, even though the network is configured with the same number of uplink and downlink CCs.

CCs are also referred to as cells or/and serving cells. In an LTE network the component carriers aggregated by a terminal generally are denoted primary cell (PCell) and secondary cells (SCells). The term Serving Cell comprises both PCell and SCells. The PCell is terminal specific and is considered "more important", due to that control signaling and other important signaling is typically handled via the PCell. The CC configured as the PCell is the primary CC whereas all other component carriers are secondary CCs.

LTE also supports uplink power control. Uplink power control is used both on the PUSCH and on the PUCCH. The purpose is to enable that the mobile terminal transmits with sufficiently high power but not too high power since the latter may increase the interference to other users in the network. In both cases, a parameterized open loop combined with a closed loop mechanism may be used. Roughly, the open loop part is used to set a point of operation, around which the closed loop component operates. Different parameters (targets and 'partial compensation factors') for user and control plane may be used. For further description of PUSCH and PUCCH power control, see sections 5.1.1.1 and 5.1.2.1 respectively of 3GPP TS 36.213, Physical Layer Procedures In order to control the mobile terminal's or the UE's uplink (UL) power the base station or eNB also called, evolved Node B uses TPC (Transmission Power Control) commands to order the UE to change its transmission power either in an accumulated or absolute fashion. In LTE Rel-10 the UL power control is managed per CC. As in Rel-8/9 PUSCH and PUCCH power control is separate. In LTE Rel-10 the PUCCH power control will only apply to the Primary CC since this is the only UL CC configured to carry PUCCH.

It should be noted that since the TPC commands do not have any ACK/NACK bits, the eNB cannot be sure that they are received by the UE, and since the UE may falsely decode the Physical Downlink Control Channel (PDCCH) and think/assume it received a TPC command, counting the used TPC commands may not be used to estimate a reliable current output power from the UE. The UE may also compensates its power level autonomously (based on pathloss estimates) and this adjustment is not known to the eNB base station. For these two reasons the eNB base station may need to receive PHR (Power Headroom Report) reports regularly in order to make competent scheduling decisions and control the UE UL power.

In e.g. Rel-8/9 the eNB base station configures the maximum output power of the UE. Since the UE is allowed to make power backoffs, the actual transmission power the UE is capable of may deviate from the configured power. The UE is configured or adapted to select a value, here denoted, Pcmax which is the actual maximum transmission power after power backoff and which may be used to calculate the power headroom left in the UE.

The UE is allowed to backoff its transmission power to ensure that out-of-band emissions do not exceed the specified maximum values. This backoff operation may also be used in other releases or other systems/technologies as well to ensure that out-of-bands emissions do not exceed specified maximum values. The corresponding allowed power reduction is referred to as MPR (Maximum Power Reduction) and A-MPR (Additional-MPR). The UE is allowed to back off its transmission power by up to the defined MPR+A-MPR value, but the UE is not required to back off as long as it meets the inter-band emission requirements. The maximum power reduction allowed for a UE in a specific deployment using a specific MCS (Modulation and Coding Scheme) and number of resource blocks is e.g. defined in tables in 3GPP TS 36.101. The tables do however only define the maximum allowed values and the eNB base station does thus not know the exact value of the applied MPR/A-MPR.

In Rel-10, the eNB base station configures the maximum output power of each CC individually. Similar to how Pcmax was selected by the UE in Rel-8/9, the UE selects a Pcmax,c for each CC which it uses to calculate the power headroom for the associated CC. Pcmax,c is the actual maximum transmission power for a specific CC configured by the UE in a specific TTI (Transmission Time Interval). It is set within an interval with the upper boundary defined by the maximum value of the UE power class and the maximum CC power configured by the eNB base station, and the lower boundary defined by taking maximum power reduction (MPR/A-MPR) into consideration.

In addition to power backoff to meet out-of-band emissions, the UE is also configured/adapted to fulfill SAR (Specific Absorption Rate) requirements which also may require the UE to back off its transmission power (possibly in addition to the backoffs made to meet the out-of-band emissions). This may be the case when the UE supports both LTE and WCDMA (Wideband Code Division Multiple Access) technologies and operates both radio access technologies simultaneously. It has therefore been agreed in 3GPP that LTE Rel-10 UEs may perform an additional power back-off for so-called "power management" purposes. This comprises but is not limited to SAR related power back-off. It has also been decided that the UE shall, when performing such a power back-off, reflect it in the computation of Pcmax and/or Pcmax,c.

Consequently, this additional power reduction will be reflected in the Pcmax and/or Pcmax,c report as well as in the PHR reports (see following section).

As previously described, in LTE Rel-8, the base station may configure the UE to send PHR reports periodically or when the change in pathloss exceeds a certain configurable and/or predetermined threshold. The PHR reports indicate how much transmission power the UE has left for a subframe I, i.e., the difference between the actual UE maximum transmit power (Pcmax,c or Pcmax) and the estimated required power. The reported value is in the range of 40 to −23 dB, where a negative value shows that the UE did not have enough power to conduct the transmission.

The eNB base station may use the PHR report as input to the scheduler. As an example, based on the available power headroom the scheduler of the eNB base station is configured to decide a suitable number of PRBs (Physical Resource Blocks) and a good/suitable/adequate MCS as well as a suitable transmit power adjustment (TPC command). In carrier aggregation the eNB base station would make such evaluation per UL CC because power is controlled per CC according to RAN1 decisions.

Since one has UL power control per CC and separate for PUSCH and PUCCH, this will also be reflected in the PHR reporting. In Rel-10, the UE will calculate one Pcmax,c value per CC and also calculate a separate power headroom per CC. For Rel-10 at least two types of power PHR reports may be used:

Type 1 PHR report—computed as: P_cmax,c minus PUSCH power: (P_cmax,c−P_PUSCH)

Type 2 PHR report—computed as: P_cmax,c minus PUCCH power minus PUSCH power: (P_cmax,c−P_PUCCH−P_PUSCH)

The Secondary CCs may always report Type 1 PHR report since they are not configured for PUCCH. The Primary CC may report both Type 1 and Type 2 PHR report. Type 1 and Type 2 PHR report may be reported in the same subframe or in separate subframes.

Rel-10, a PHR report for one CC may be transmitted on another CC. This would enable to report rapid pathloss changes on one or more CCs as soon as the terminal has PUSCH resources granted on any activated UL CC. More specifically, a pathloss change by more than dl-Pathloss-Change dB on any activated CC may trigger PHR reports for all activated CCs, independent whether a valid PUSCH grant is available or not for a CC. All PHR reports may be transmitted together in the same MAC control element (CE) in the same subframe on the same CC. This CC may be any CC for which the terminal has PUSCH resources granted.

Rel-10, all PHRs to be reported in a specific subframe may be included in the same MAC CE and transmitted on one of the activated UL CCs. There is at the most one PHR report or Extended PHR MAC CE per TTI.

In addition to the PHR report, there may be a Pcmax,c report per CC reporting the actual maximum transmission power of the UE, denoted Pcmax,c 3GPP TS 36.213. As explained before, the Pcmax,c value is affected by UE power reductions due to out-of-band emissions requirements (MPR/A-MPR) or SAR (power management) requirements. The Pcmax,c value being sent in addition to the PHR value enables the network or network nodes (e.g. base station) to estimate the reason for the change in power headroom, i,e., whether it was due to a change in the available transmit power (Pcmax,c) or due to a change in pathloss and TPC command errors.

In Rel-10, the Pcmax,c is included in the same Extended PHR MAC CE as the associated PHR.

The Extended PHR MAC (Medium Access Control) CE is defined in Rel-10 of 3GPP TS 36.321. An example of the structure is shown in FIG. 6. for definitions of included fields refer to 3GPP TS 36.321. The acronyms used e.g. R, V are also defined in 3GPP TS 36.321. PHR may, in Rel-10, be reported for all configured and activated CCs. This means that some of the CCs reporting PHR may not have a valid UL grant in the TTI where PHR is reported. They will then use a reference format PUSCH and/or PUCCH to report a so called virtual/reference format PHR. These reference formats are defined in 3GPP TS 36.213.

It is possible to reduce the reporting overhead by omitting the Pcmax,c reports for CCs for which no valid UL grant has been provided. It should be noted that a Pcmax,c report computed for a reference format does not necessarily comprise any new/beneficial information for the network.

In RAN2 (Radio Access network LTE layer2 radio protocols) it is currently being discussed how power reductions related to SAR (and power management in general) requirements will impact the Power Headroom reporting.

As explained earlier, for Rel-10, the additional power backoff will be included in the Pcmax,c value reported together with the associated PHR for a specific CC.

Since the Pcmax,c value will then be dependent on two unknown factors; the MPR+A-MPR and the additional power management power reduction, it may not be possible for the eNB to derive which MPR/A-MPR was used by looking at the reported Pcmax,c and associated PHR. In other words, the additional information obtained by explicitly reporting the Pcmax,c in LTE Rel-10 vanishes partly by introducing the additional power back-off.

This is problematic as it is important for the network node(s) (e.g. eNB base station) to be able to track the MPR/A-MPR behaviour in order to optimize link adaptation and scheduling. The additional power back-off adds some "noise" to the Pcmax,c reports making it even more difficult to perform the tracking of the MPR/A-MPR.

It should be noted that since SAR (power management) reduction may not always be applied, it could be useful for the eNB base station to know which PHR reports it may use to derive the MPR/A-MPR from. Currently there is no way for the eNB to know this and to guess which part of the power reduction taken into account in Pcmax,c is not feasible considering that only ranges/tables are defined in 3GPP TS36.101 as previously described.

SUMMARY

It is therefore an object of the exemplary embodiments to address at least the above mentioned problems and to provide methods and apparatuses (e.g. a UE and/or a base station) for enabling a base station to be informed that (additional) power reduction has been used/applied by a UE, so that network optimization in terms of at least link adaptation and scheduling is achieved.

Thus, according to an aspect of exemplary embodiments, at least some of the above stated problems are solved by means of a method, for use in a user equipment for reporting power headroom reports to a radio base station in the telecommunications system, the method comprises: deciding on application of a power backoff; indicating in a power headroom report of the application of the power backoff; and sending, to the radio base station, the power headroom report indicating that the power backoff has been applied by the user equipment.

According to further aspect exemplary embodiments, at least some of the above stated problems are solved by means of a method for use in a radio base station in a telecommunications system, the method comprises: receiving a power headroom report from a user equipment and determining from the received power headroom report whether a power backoff has been applied by the user equipment.

Further is disclosed, according to a further aspect of exemplary embodiments, a user equipment for reporting power headroom reports to a radio base station, for power management in a telecommunications system, the user equipment comprises a processing unit configured to decide on application of a power backoff; the processing unit is further configured to indicate in a power headroom report of the application of the power backoff; and a transceiver configured to send, to the radio base station, the power headroom report indicating that the power backoff has been applied by the user equipment.

It is further disclosed, according to yet another aspect of exemplary embodiments, a radio base station in a telecommunications system, the radio base station comprises: a transceiver configured to receive a power headroom report from a user equipment; and a processing unit configured to determine from the received power head report whether a power backoff has been applied by the user equipment.

According to an exemplary embodiment, the user equipment (UE) uses an existing bit of the power head room report to inform (or indicate to) the network node (e.g. base station or eNB base station) that additional power reduction (i.e., other than MPR/A-MPR and $\Delta T_C$) has been applied to the Pcmax,c or Pcmax values reported in a given TTI. This enables the base station to determine/know if a (specific) MIR report may be used to derive and learn the expected MPR/A-MPR of the UE.

Its should be noted that it is currently not decided/known if the power back off will be applied per component carrier or per UE. Depending on which solution is chosen, one exemplary embodiment is to let the indication occur once per TTI where PHR is reported. Another embodiment is to have the indication for each individual power headroom or Pcmax,c value reported in the given TTI.

According to a further embodiment, if the SAR (power management) power reduction is to be reported as a separate element, a bit in the Extended PHR could be used to inform the base station to expect such an element in the same subframe.

An advantage of embodiments is to enable, by means of this indication of the power backoff in the PHR report, the radio base station to know when it is possible to use the reported PHR to estimate the impact of e.g. Modulation and Coding Scheme and number of resource blocks combinations on the available transmit power of the user equipment.

A further advantage of the embodiments is to enable the radio base station to track and/or learn the MPR/A-MPR (Maximum Power Reduction/Additional MPR)-behaviour of the UE(s) in order to optimize link adaptation and scheduling.

Yet another advantage of the embodiments is to allow the radio base station to distinguish between at least two types of power backoffs in the network and to decide based on the indication how to use the reported values.

Still other objects and features and advantages of the exemplary will become apparent from the following detailed description in conjunction with the drawings.

BRIEF DESCRIPTION OF THE DRAWINGS

FIG. 1 is a simplified diagram of a UE downlink physical resource.

FIG. 2 shows a simplified LTE time-domain structure.

FIG. 3 is a simplified structure of a Downlink subframe.

FIG. 4 depicts a simplified PUSCH resource assignment.

FIG. 5 is a diagram illustrating an example of aggregation of multiple component carriers in LTE.

FIG. 6 illustrates the prior art Extended PHR MAC CE as depicted in 3GPP TS 36,321.

FIG. 9 shows an exemplary embodiment where the P-bit in each Pcmax,c octet is set to "1" to indicate that power backoff has been applied at least for this carrier.

FIG. 10 shows another exemplary embodiment where the P-hit is set to "1" to indicate that power back off has been applied and where the T-hit is set to "1" to indicate that the power backoff applied exceeds a certain threshold.

FIG. 10A: Table 1: Example of P and T bits used to encode four different backoff values. The codepoint "00" may e.g. indicate that the power backoff did not exceed "backoff value 0"; codepoint "01" may indicate that the power backoff did not exceed "backoff value 1"; and so on.

DETAILED DESCRIPTION

The exemplary embodiments describe different ways of indicating to a radio base station e.g. a eNB base station that an additional power backoff has been made in UE e.g. to fulfill SAR requirements in addition to a regular power back-off such as e.g. MPR/A-MPR and/or $\Delta T_C$ and which has impacted the actual transmission power of the UL CC(s) utilized by the UE. This transmission power (Pcmax,c) may be reported per CC to the eNB as part the power headroom report.

It should be noted that the type of power backoff which is indicated in accordance with one or several exemplary embodiments may be any type of additional power backoff. The embodiments do not limit the type or reason for power management considered as "regular" or "additional" in any way. Hence it allows the radio base station distinguishing at least two types of power backoffs in the network and to decide based on the indication how to use the reported values (power headroom and/or Pcmax,c).

Examples where an exemplary method may be applied is to indicate power backoff due to SAR requirements, or other types of additional power backoff applied by the UE. The indicated backoff may also be restricted by a threshold value, i.e. the indication may be set if the additional power backoff exceeds or falls below a certain value. This threshold may either be hardcoded/predefined, chosen or selected by the UE or configured by one or several network nodes or set in some other way not listed here.

In the exemplary embodiments the bit used for power backoff indication is denoted P, but the embodiments shall not be limited to this denotation or any other denotations used in the examples below. In the exemplary embodiments below the P-bit is set to a predefined value e.g. to "1" to indicate that the additional power backoff has been applied. Note that the exemplary embodiments would be valid also if the predefined value "0" is used to indicate that power backoff has been applied.

It should be noted that the different exemplary embodiments are described herein by way of reference to particular example scenarios. In particular, the embodiments are described in a non-limiting general context in relation to communicating power headroom reports in a multi-carrier system that is based on the LTE concept (e.g. LTE-advanced). It should be noted that the embodiments are not restricted to LTE but may be applicable in other wireless systems e.g. WIMAX or WCDMA (3G) or WLAN or a combination of access technologies wherein power headroom reporting may be communicated. In addition, the exemplary embodiments are not restricted to a multi-carrier system although the following exemplary embodiments will be described in relation to the multi-carrier LTE system.

Figure 7:
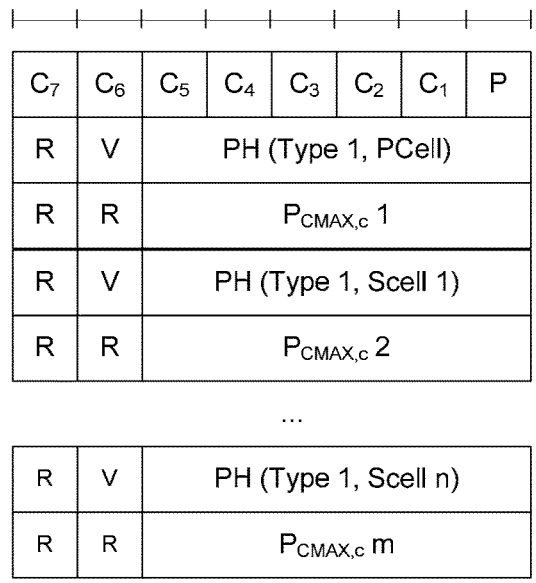
FIG. 7 illustrates an exemplary embodiment where the P-bit in the first octet is set to "1" to indicate that power backoff has been applied.

According to an embodiment, power backoff is indicated in the Extended PHR MAC CE bitmap octet. In e.g. the Rel-10 Extended PHR MAC CE there is currently one reserved bit (R) in the bitmap indicating which component carriers that are reporting PHR in this MAC CE (see first octet in FIG. 6). According to an exemplary embodiment (see FIG. 7) this bit may be set to a predefined value e.g. to "1" to indicate that power backoff has been applied. In this exemplary embodiment the power backoff may either be assumed to impact all Pcmax,c values or a subset of them. As previously described, the bit may be set to "0" instead of "1" for the same purpose of indicating that power back-off has been applied by the UE.

Figure 8:
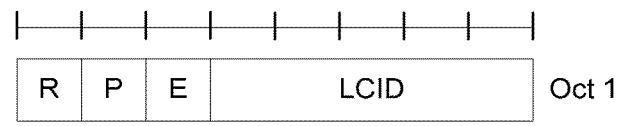
FIG. 8 shows another exemplary embodiment where the P-bit of the MAC subheader is used to indicate that power backoff has been applied.

According to another embodiment (see FIG. 8), power backoff is indicated in the MAC subheader. In the MAC subheader used by the Extended PHR MAC CE there are two reserved bits. Either one of these bits could be used as a power backoff indicator in accordance with an exemplary embodiment. This bit may be set to a predefined value e.g. to "1" to indicate that power backoff has been applied. In this embodiment the power backoff may either be assumed to impact all Pcmax,c values or a subset of them.

It should be mentioned that this embodiment may be applied also to the PHR MAC CE existing in Rel-8/9 version of the 3GPP TS36.321 specification. Hence, the UE may send the PHR in an extended PHR MAC CE or in a "regular" or "normal" PHR MAC CE and the provision of the indication (e.g. the setting of the bit to a predefined value) of application of power backoff is done in the extended PHR MAC CE or in the or in a "regular" or "normal" PHR MAC CE or in a MAC subheader used by the extended PHR MAC CE.

According to a further embodiment (see FIG. 9), power backoff is indicated per Pcmax or Pcmax,c. As an example, each Pcmax,c octet of the Extended PHR MAC CE defined in 3GPP TS36.321 contains 2 reserved bits. One of these may be used as a power backoff indicator in accordance with an exemplary embodiment. This bit may be set to a predefined value e.g. to "1" to indicate that power backoff has been applied. In this embodiment the power backoff may be assumed to impact only the Pcmax,c values with the indication bit set to the predefined valu.

Since each Pcmax,c is associated with a PHR octet, another embodiment may be to use one reserved bit of the PHR octet to indicate the power backoff. This embodiment may be applied also to the PHR MAC CE existing in Rel-8/9 version of the 3GPP TS36.321 specification.

Another embodiment is to use any reserved bit which would be identified in the standards, to indicate that a power backoff has occurred. Using more than one bit (e.g. a bit field) would even enable a per-CC backoff indication.

Another exemplary embodiment (see FIG. 10) is to indicate with two separate bits that:
1) power backoff has occurred and
2) the backoff has exceeded a certain threshold.

One bit may then be set to a predefined value e,g. to "1" to indicate that power backoff has been applied. The other bit may in addition he set to a predefined value e.g. to "1" to indicate that a defined/configured threshold has been exceeded. These two bits used for indication may be two reserved bits of the existing Extended PHR MAC CE or PHR MAC CE in any combination. These two bits may also be combined to be able to indicate more selectively the applied power backoff, e.g. one of the four code points could indicate no backoff applied, and the other three code points could indicate increasing levels of applied backoff. The borders between the levels may be configured or hardcoded. See Table 1 of FIG. 10A as an example.

An exemplary embodiment may be realized by combining the embodiment describing that power backoff indication may be provided in the Extended PHR MAC CE bitmap octet with the embodiment describing that Power backoff indication is provided per Pcmax,c. The bit of the bitmap (P in FIG. 7) would then indicate that an additional power backoff was applied for this UE and the bit for each Pcmax,c report (P in FIG. 9) would be used to indicate which Pcmax,c reports this applies to or which Pcmax,c reports that have a backoff above a certain threshold value.

This combination of bits may also be used to indicate an interval for a specific value or value range of the backoff similar.

According to the above described exemplary embodiments, it is the UE e.g. a mobile terminal or any suitable terminal, that is configured to decide on applying a backoff power i.e. (additional) power reduction and the UE is farther configured or adapted to indicate in one or several PHR reports the application of backoff power. The UE is further configured or adapted to send the PHR to the (eNB) base station. The base station may be the serving base station. The (eNB) base station is configured to receive a PHR, report from a UE, and the eNB is further configured to determine based on the received PHR report whether the UE have applied power backoff. The indication that an addition or special power backoff is made/applied by the UE and also when it is made/applied and the reason for applying it, is informed to the base station or eNB base station. I.e. the base station is made aware of when an "additional" or "special" power backoff (e.g. to fulfill SAR requirements) has been applied and thereby able to distinguish it from "normal" power backoff or power reduction (e.g. MPR, A-MPR) or whether the power backoff has been applied by the UE due to power management when power backoff impacts the actual transmission power utilized by the UE. These are advantageous, because without this indication it (the base station) will not be aware of it and just obtain the resulting PHR report comprising the power headroom value(s) and optionally the Pcmax(,c) value(s).

In addition if the power backoff indication is only used for specific types of power backoffs, this information will be even more valuable to the eNB. For example if the standard is specified to only use this indication for power backoff which is due to other reason than MPR/A-MPR, the eNB base station could, advantageously use this indication to know when it is possible to use the reported PHR to estimate the impact of MCS and RB combinations on the available transmit power. This information may be used by the network (eNB) to track the MPR/A-MPR behaviour in order to optimize link adaptation and scheduling.

Also if the power backoff indication is dependent on a certain power backoff threshold, the eNB may learn if there has been a significant power backoff or not. Based on that the base station may judge if the power headroom report could still be used for all or for some CCs to estimate the MPR/A-MPR of the used MCS and RB combinations, which is a further advantage.

Figure 11:
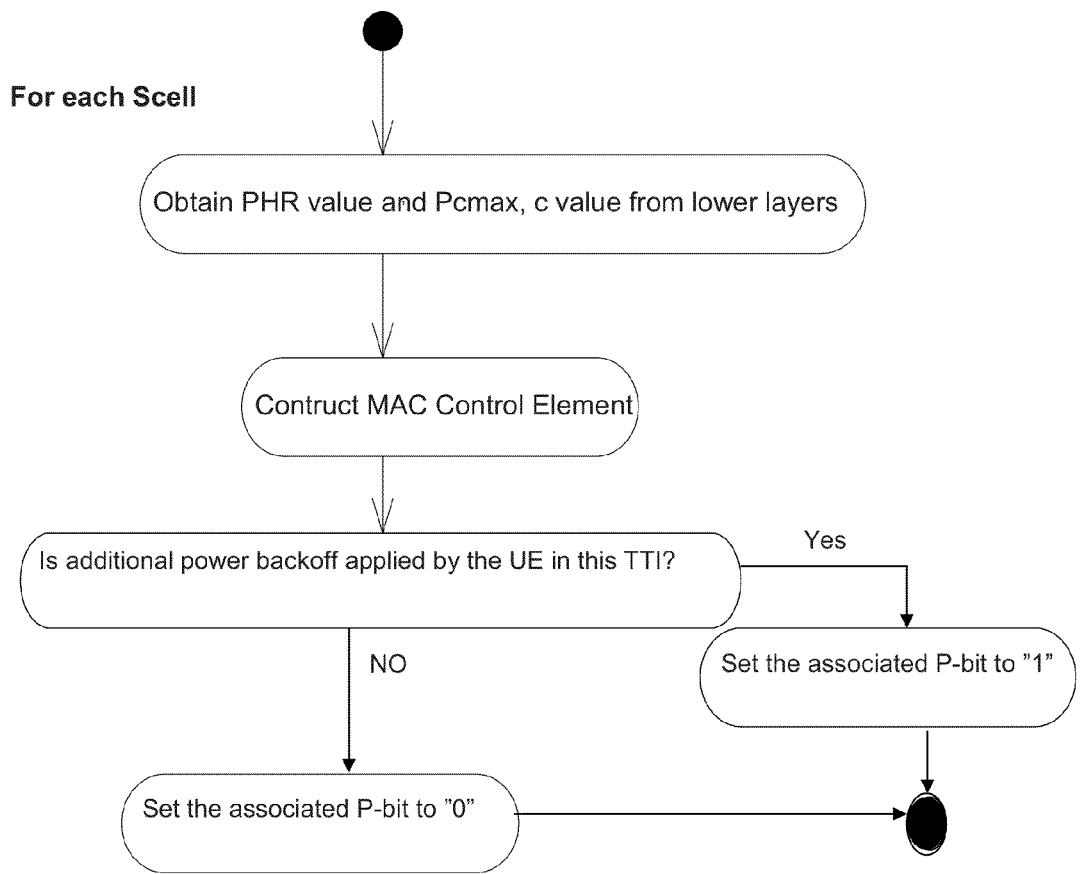
FIG. 11 depicts an exemplary implementation in a UE of an exemplary embodiment where one bit in a MAC CE is used to indicate additional power backoff.

As previously described, the UE or mobile terminal is adapted to inform/indicate to the base station of the application of power backoff. FIG. 11 illustrates an exemplary implementation in a UE of an exemplary embodiment where one bit in a MAC CE is used to indicate additional power backoff, for the UE or for all individual Scells. As shown in this example, the UE starts by obtaining a PHR values and Pcmax,c values from lower layers and constructs a MAC control element. A check is performed whether additional power backoff is applied by the UE in a defined TTI. If the determination is "Yes", the P-bit is set to "1" otherwise if the determination in "N", the P-bit is set to "0".

Figure 12:
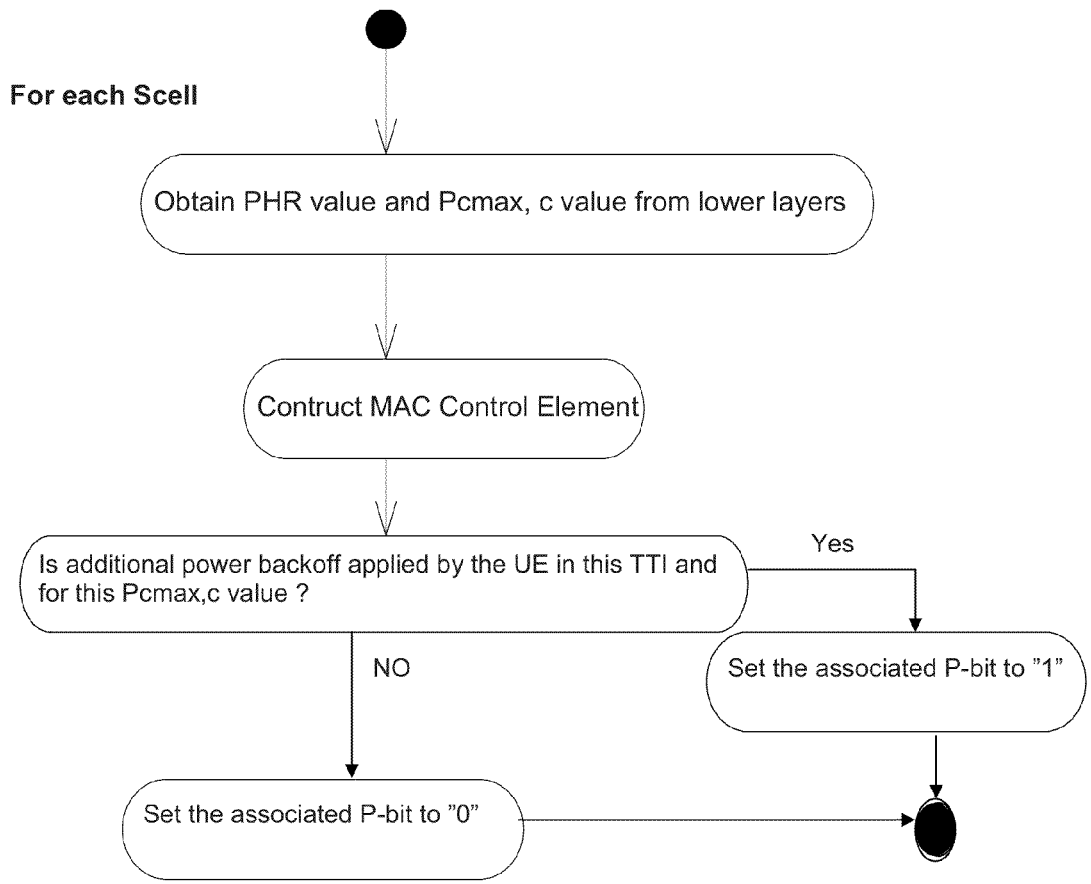
FIG. 12 illustrates another exemplary implementation in a UE of an exemplary embodiment where one bit per Pcmax,c or PH octet is used to indicate additional power backoff.

FIG. 12 illustrates another exemplary implementation in a UE where one bit per Pcmax,c or PH octet is used to indicate additional power backoff, individually for each Scell. As shown in this example, the UE starts by obtaining a PHR values and Pcmax,c values from lower layers and constructs a MAC control element. A check is performed whether additional power backoff is applied by the UE a defined TTI and for the Pcmax,c value. If the determination is "Yes", the P-bit is set to "1" otherwise if the determination in "N", the P-bit is set to "0".

Figure 13:
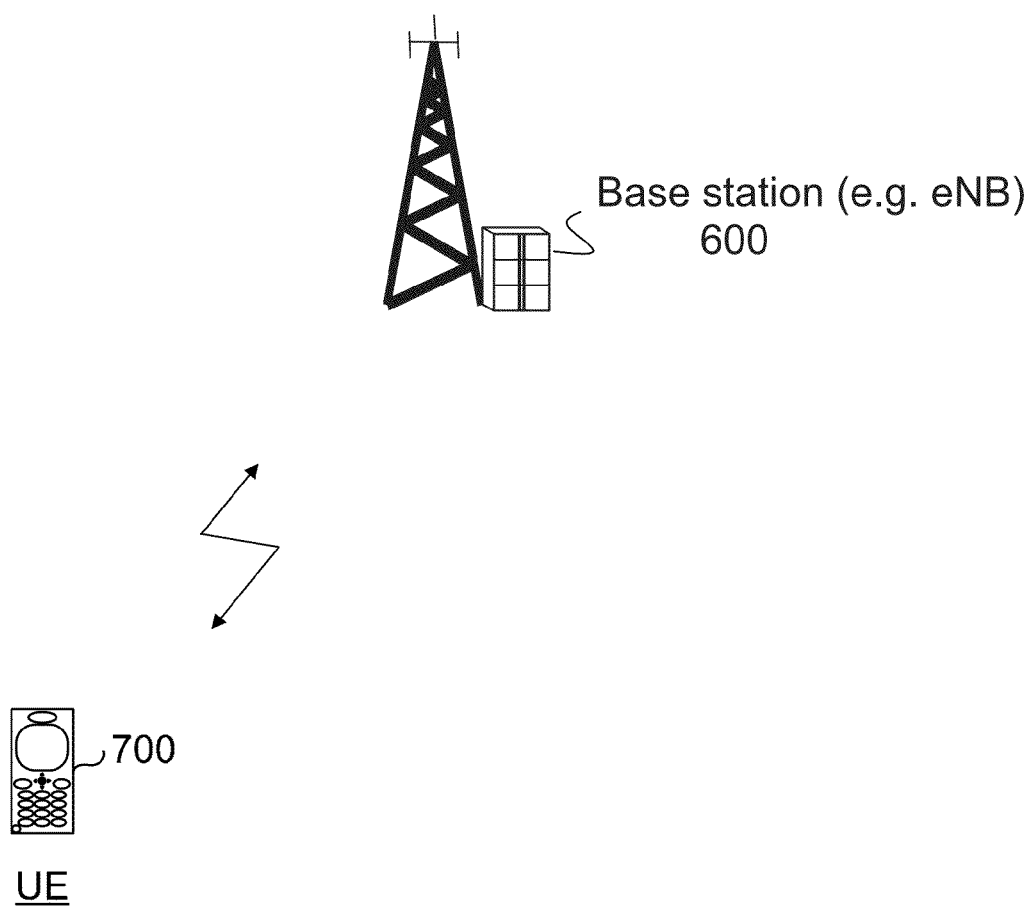
FIG. 13 is a simplified diagram illustrating an exemplary wireless telecommunications system wherein exemplary embodiments may be applied.

FIG. 13 is a simplified diagram illustrating an exemplary wireless telecommunications system wherein exemplary embodiments may be applied. In general and as previously described the UE is configured or adapted to decide on applying a backoff power i.e. (additional) power reduction and the UE is further configured or adapted to indicate in one or several PHR reports the application of backoff power. The UE is further configured or adapted to send the PHR to the (eNB) base station. The base station may be the serving base station. The (eNB) base station is configured to receive a PHR report from a UE, and the eNB is further configured to determine based on the received PHR report whether the UE applies power backoff. The base station is made aware of when an "additional" or "special" power backoff has been applied due to power management e.g. to fulfill SAR requirements, when the power backoff impacts the actual transmission power utilized by the UE or due to power management in addition to any power backoff applied by the UE for MPR/A-MPR and thereby the radio base station is capable to distinguish from "normal" power backoff or power reduction (e.g. MPR, A-MPR). As previously described, the UE is, according to an embodiment, configured to use an existing bit of the power head room report to inform or indicate to the network node e.g. base station or eNB base station that additional power reduction i.e., other than MPR/A-MPR and $\Delta T_C$ has been applied, to the Pcmax,c or Pcmax values reported in a given TTI. This enables the base station to determine if a (specific) PHR report may be used to derive and learn the expected MPR/A-MPR of the UE.

Figure 14:
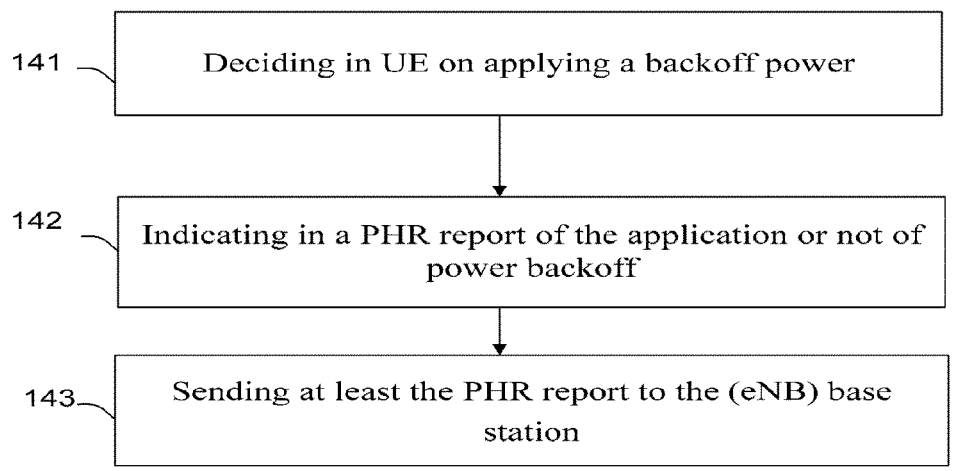
FIG. 14 a diagram illustrating a flowchart of a method, performed in a UE according to exemplary embodiments.

FIG. 14 illustrates the main steps performed by a UE in accordance with previously described embodiments. For sake of clarity the main steps performed by the UE and the different embodiments are repeated again.

As shown in FIG. 14, the procedure or method for use in the UE for reporting power headroom reports to a radio base station or eNB, for power management, comprises:

(141) deciding on application of a power backoff;
(142) indicating in a power headroom report of the application of the power backoff; and
(143) sending, to the radio base station, the power headroom report indicating that the power backoff has been applied by the UE.

According to an embodiment, the UE indicates in the power headroom report application of power backoff due to power management, in addition to indicating in the same power headroom report a maximum transmit power used by the UE.

According to another embodiment, the UE sends the power headroom report in an extended power headroom medium access control element (extended PHR MAC CE) or in a PHR MAC CE and the indication of application of the power backoff is provided in the extended PHA MAC CE or in the PHR MAC CE or in the MACH subheader used by the extended PHR MAC CE.

According to a farther embodiment, the UE indicates the power backoff being an additional power backoff applied by the UE in a transmission time interval (TTI).

In a further embodiment, the UE perform the indication by setting a reserved bit in the power headroom report to a predefined value e.g. to "1" when the UE decides to apply power backoff. The UE may further indicate in the power headroom report that the power backoff has exceeded a certain defined power backoff threshold, by setting a further bit in the power headroom report to a predefined value e.g. to "1".

According to yet another embodiment, the UE indicates of the application of the power backoff each time a maximum transmit power used by the UE is indicated in the power headroom report.

According to yet another embodiment, the UE indicates of the application of the power backoff due to power management when the power backoff impacts the actual transmission power utilized by the UE.

According to yet another embodiment, the UE indicates of the application of the power backoff due to power management in addition to any power backoff applied by the UE MPR/A-MPR.

Additional steps or complementary steps performed by the UE have already been disclosed before and are not repeated again.

Figure 15:
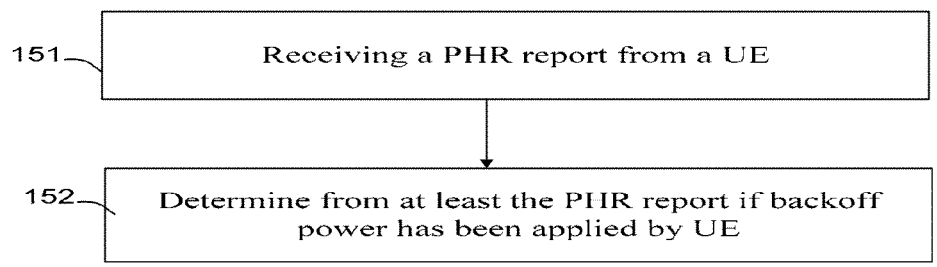
FIG. 15 is a diagram illustrating a flowchart of a method, performed in a base station according to exemplary embodiments.

FIG. 15 illustrates the main steps performed by a radio base station in accordance with previously described embodiments. For the sake of clarity the main steps performed by the base station or eNB and the different embodiments are repeated again.

As shown in FIG. 15, the main steps performed by the radio base station are:

(151) receiving a power headroom report from a UE and
(152) determining from the received power headroom report whether a power backoff has been applied by the user equipment.

According to an embodiment, the radio base station determines from the received power headroom report whether power backoff has been applied by the UE due to power management and further determines from the report a maximum transmit power used by the UE.

According to another embodiment the radio base station determines whether a reserved bit in the power headroom report is set to a predefined value e.g. "1", According to yet another embodiment, the radio base station also determines whether a further reserved bit in the power headroom report is set to a predefined value e.g. "1" indicating that the power backoff has exceeded a certain defined power backoff threshold.

According to a further embodiment, the radio base station determines whether the power backoff is an additional power backoff applied by the UE in a TTI.

According to a further embodiment, the radio base station determines whether the power backoff has been applied by the UE due to power management when the power backoff impacts the actual transmission power utilized by the UE.

According to a further embodiment, the radio base station determines whether the power backoff has been applied by the UE due to power management in addition to any power backoff applied by the user equipment for maximum power reduction, MPR, and additional MPR, A-MPR.

According to yet another embodiment, the radio base station receives the power headroom report in an extended PHR MAC CE or in a PHR MAC CE. If power backoff has been applied by the UE, such indication is received by the radio base station in the extended PHR MAC CE or in the PHR MAC CE or in the MAC subheader used by the PHR MAC CE.

This way, the radio base station or eNB will be able to distinguish (systematic) MPR/A-MPR related power backoff from e.g. unpredictable power management related to power reductions and hence the eNB will adapt the link in a more efficient way i.e. the performance of link adaptation is improved compared to that if the eNB cannot distinguish MPR/A-MPR.

Figure 16:
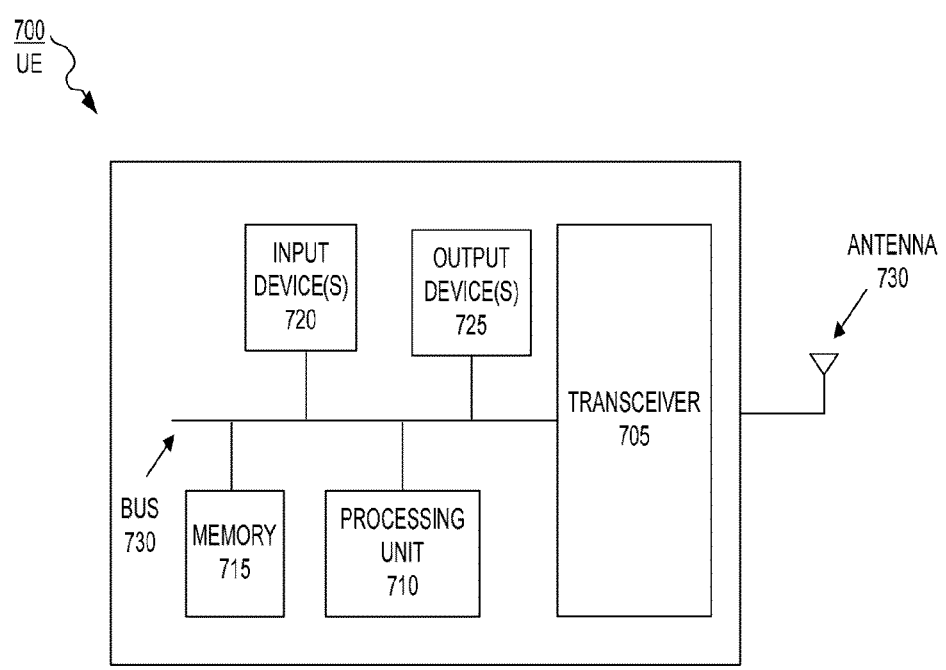
FIG. 16 illustrates a block diagram of an exemplary UE in accordance with exemplary embodiments.

Referring to FIG. 16 there is illustrated a diagram of exemplary components of UE 700. As illustrated, UE 700 may include one or several antennas (only one antenna is shown) 730, a transceiver 705, processing logic 710, a memory 715, an input device(s) 720, an output device(s) 725, and a bus 730. Antenna 730 may include one or more antennas to transmit and/or receive radio frequency (RF) signals over the air. Antenna 730 may, for example, receive RF signals from transceiver 705 and transmit the RF signals over the air to an eNB and receive RF signals over the air from said eNB and provide the RF signals to transceiver 705. The processing logic or circuit 710 of the UE is e.g. configured to decide on applying backoff power and is further configured to form and indicate in at least a PHR report of its decision by setting a bit or combination of bits etc in accordance with previously described embodiments and the antenna 730 and/or transceiver is/are configured to send at least the PHR report to the base station. Transceiver 705 may include, for example, a transmitter that may convert baseband signals from processing logic 710 to RF signals and/or a receiver that may convert RF signals to baseband signals. Alternatively, transceiver 705 may include a transceiver to perform functions of both a transmitter and a receiver. Transceiver 705 may connect to antenna 730 for transmission and/or reception of the RF signals. The processing unit 710 is, as previously described, configured to indicate in the power headroom report application of power backoff due to power management, and is further configured to indicate in the same power headroom report a maximum transmit power used by the UE. The transceiver 705 is, according to an embodiment, configured to send the power headroom report in an extended PHR MAC CE or in a PHR MAC CE. The processing unit 710 is further configured to indicate the power backoff as an additional power backoff applied by the UE in a TTI. The processing unit 710 is configured to set a reserved bit in the power headroom report to a predefined value e.g. to "1" when the processing unit 710 decides to apply power backoff. According to an embodiment, the processing unit 710 is further configured to indicate in the power headroom report that the power backoff has exceeded a certain defined power backoff threshold, by setting a further bit in the power headroom report to a predefined value e.g. to "1". The bit indication(s) is provided in the extended PHR MAC CE or in the PHR MAC CE or in the MAC subheader.

The processing unit 710 according to another embodiment, is configured to apply the power backoff each time a maximum transmit power used by the UE indicated in the power headroom report. The processing unit 710 is further configured to determine whether the power backoff has been applied due to power management when the power backoff impacts the actual transmission power utilized by the UE. The processing unit 710 is further configured to determine whether the power backoff has been applied by the UE due to power management in addition to any power backoff applied by the UE for maximum power reduction, MPR, and additional MPR, A-MPR Processing logic/unit 710 may include a processor, microprocessor, an application specific integrated circuit (ASIC), field programmable gate array (FPGA), or the like. Processing logic 710 may control operation of UE 700 and its components. Referring to FIG. 16, the UE further comprises a memory 715 which may include a random access memory (RAM), a read only memory (ROM), and/or another type of memory to store data and instructions that may be used by processing logic 710. Input device(s) 720 may include mechanisms for entry of data into UE 700. For example, input device(s) 720 may include input mechanisms, such as microphone, input elements, display, etc. Output device(s) 725 may include mechanisms for outputting data in audio, video and/or hard copy format. For example, output device(s) 725 may include speaker, display, etc. Bus 730 may interconnect the various components of UE 700 to permit the components to communicate with one another. Although FIG. 16 shows exemplary components of UE 700, in other implementations, UE 700 may contain fewer, different, or additional components than depicted in FIG. 16. In still other implementations, one or more components of UE 700 may perform the tasks described as being performed by one or more other components of UE 700.

Figure 17:
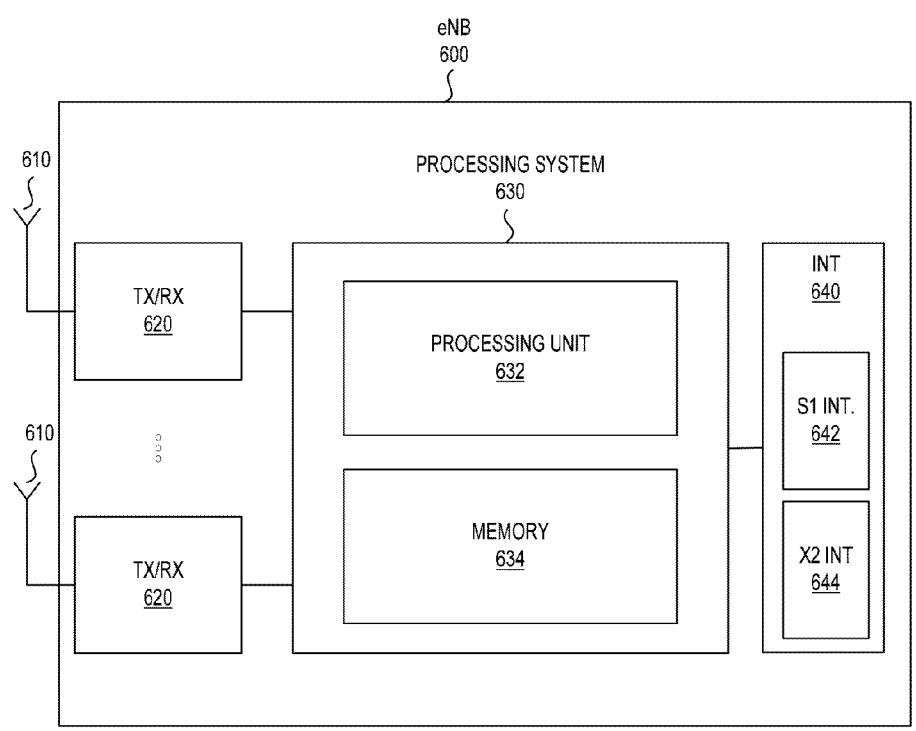
FIG. 17 illustrates a block diagram of an exemplary base station in accordance with exemplary embodiments.

Referring to FIG. 17 there is illustrated a block diagram of an exemplary radio base station 600 (e.g. eNB or eNodeB). As illustrated, eNB 600 may include antennas 610, transceivers 620, a processing system 630, and an interface 640. Antennas 610 may include one or more directional and/or omni-directional antennas. Transceivers 620 may be associated with antennas 610 and include transceiver circuitry for transmitting and/or receiving symbol sequences in a network via antennas 610. Processing system 630 may control the operation of eNB 600. Processing system 630 may also process information received via transceivers 620 and interface 640. As illustrated, processing system 630 may include processing logic 632 and a memory 634. It will be appreciated that processing system 630 may include additional and/or different components than illustrated in FIG. 6. Processing logic 632 may include a processor, microprocessor, an ASIC, FPGA, or the like. Processing logic 632 may process information received via transceivers 620 and interface 640. The antenna and/or transceiver is configured to receive at least a PHR report from a UE and the processing logic may determine from the at least PHR report whether the UE applies or applied a backoff power. According to an embodiment, the processing unit 632 is further configured to determine from the received power headroom report a maximum transmit power used by the UE. The processing unit 632 is further configured to determine whether a reserved bit in the power headroom report is set to a predefined value e.g. to "1". According to a farther embodiment, processing unit 632 is further configured to determine whether a further reserved bit in the power headroom report is set to a predefined value e.g. to "1" indicating that the power backoff has exceeded a certain defined power backoff threshold. The processing unit 632 may further be configured to determine whether the power backoff is an additional power backoff applied by the UE in a TTI.

As previously described the transceiver 620 of the eNB 600 is configured to receive the power headroom report in an extended PHR MAC CE or in a PHR MAC CE and the indication that the UE applied power backoff may be provided in the PHR MAC CE or in the MAC CE or in the MAC subheader as previously described.

Although FIG. 17 shows exemplary components of eNB 600, in other implementations, eNB 600 may contain fewer, different, or additional components than depicted in FIG. 17. In still other implementations, one or more components of eNB 600 may perform the tasks described as being performed by one or more other components of eNB 600.

Its should be noted that it is currently not decided/known if the power back off will be applied per CC or per UE. Depending on which solution is chosen, one exemplary embodiment could be to let the indication occur once per TTI where PHR is reported. Another embodiment is to have the indication for each individual power headroom or Pcmax,c value reported in the given TTI. According to a further embodiment, if the SAR (power management) power reduction is to be reported as a separate element, a bit in the Extended PHR could be used to inform the base station to expect such an element in the same subframe.

It should be mentioned that the embodiments have been adopted/approved by the standardization group 3GPP as decided in3GPP TSG-RAN2 meeting #73 in Taipei, Taiwan, in Feb. 21-25 2011, in particular in the publicly available change requests (CR) R2-111601 and R2-111680 entitle "Adding a Power management indication in PHR".

While communications according to the LTE standard are discussed by way of example, communications may be provided according to other wireless communications standards such as previously mentioned and also such as Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA; CDMA2000, and/or Universal Mobile Telecommunications System (UMTS) frequency bands. Moreover, user or mobile terminals/equipment according to embodiments may, for example, be any wireless ("mobile") communication terminals ("wireless terminals" or "terminals") that are configured to carry out cellular communications (e.g., cellular voice and/or data communications) using multiple component carriers, single component carrier and/or a combination thereof.

Various embodiments have been described fully herein with reference to the accompanying figures, in which various embodiments are shown. This embodiments may, however, be embodied in many alternate forms and should not be construed as limited to the embodiments set forth herein.

Accordingly, while the embodiments is susceptible to various modifications and alternative forms, specific embodiments thereof are shown by way of example in the drawings and were described in detail herein. It should be understood, however, that there is no intent to limit the embodiments to the particular forms disclosed, but on the contrary, the embodiments is to cover all modifications, equivalents, and alternatives falling scope of the embodiments as defined by the claims. Like numbers refer to like elements throughout the description of the figures.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element or variants thereof, it maybe directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although sonic of the diagrams include arrows on communication paths to show a primary direction of communication, it is to be understood that communication may occur in the opposite direction to the depicted arrows.

Exemplary embodiments are described herein with reference to block diagrams and/or flowchart illustrations of computer-implemented methods, apparatus (systems and/or devices) and/or computer program products. It is understood that a block of the block diagrams and/or flowchart, illustrations, and combinations of blocks in the block diagrams and/or flowchart illustrations, maybe implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that may direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only Memory (EPROM or Flash memory) circuit, a portable compact disc read-only memory (CD-ROM), and a portable digital video disc read-only memory (DVD/Blue Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the embodiments described herein may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

Unless otherwise defined, all terms (including technical and scientific terms) used herein have the same meaning as commonly understood in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the specification, there have been disclosed exemplary embodiments and, although specific terms are employed, they are used in a generic and descriptive sense only and not for purposes of limitation.

Abbreviations
CCI—Component Carrier identifier
CC—Component Carrier
PCC—Primary Component Carrier
SCC—Secondary Component Carrier
PHR—Power Head Room
PCell—Primary Cell
SCell—Secondary Cell
UL—Uplink
DL—Downlink
MPR—Maximum Power Reduction
A-MPR—Additional Maximum Power Reduction
SAR—Specific Absorption Rate

The invention claimed is:

1. A method implemented by a user equipment for sending power headroom reports to a radio base station, for power management in a telecommunications system, the method comprising:
deciding whether to apply power backoff due to power management;
in accordance with that decision, indicating in a power headroom report whether power backoff has been applied due to power management, wherein said indicating comprises indicating that power backoff has been applied due to power management, if power backoff has been applied and the power backoff impacts the actual transmission power utilized by the user equipment; and
sending the power headroom report to the radio base station.

2. The method according to claim 1, wherein said indicating comprises indicating in the power headroom report a maximum transmit power used by the user equipment for a serving cell.

3. The method according to claim 1, wherein said sending comprises sending the power headroom report in an extended power headroom medium access control element or in a power headroom medium access control element, and wherein said indicating comprises providing an indication of whether power backoff has been applied due to power management in either the extended power headroom medium access control element, the power headroom medium access control element, or a medium access control subheader used by the extended power headroom medium access control element.

4. The method according to claim 1, wherein said indicating further comprises indicating in the power headroom report a type of power backoff applied in a transmission time interval as being either regular or additional.

5. The method according to claim 1, wherein indicating said comprises setting a reserved bit in the power headroom report to a predefined value responsive to deciding to apply power backoff due to power management.

6. The method according to claim 5, further comprising indicating in the power headroom report that applied power backoff due to power management has exceeded a certain defined power backoff threshold, by setting a further bit in the power headroom report to a predefined value.

7. The method according to claim 1, further comprising indicating whether power backoff has been applied due to power management each time a maximum transmit power used by the user equipment is indicated in the power headroom report.

8. The method according to claim 1, wherein said indicating comprises indicating whether power backoff has been applied due to power management, in addition to indicating whether power backoff has been applied for maximum power reduction (MPR) and additional MPR (A-MPR).

9. A method implemented by a radio base station in a telecommunications system, the method comprising:
receiving a power headroom report from a user equipment; and
determining from the received power headroom report whether power backoff has been applied by the user equipment due to power management, wherein said determining comprises determining that power backoff has been applied due to power management, if power backoff has been applied and the power backoff impacts the actual transmission power utilized by the user equipment.

10. The method according to claim 9, wherein said determining further comprises determining from the power headroom report a maximum transmit power used by the user equipment for a serving cell.

11. The method according to claim 9, wherein said determining further comprises determining whether a reserved bit in the power headroom report is set to a predefined value.

12. The method according to claim 11, wherein said determining further comprises determining whether a further reserved bit in the power headroom report is set to a predefined value indicating that applied power backoff due to power management has exceeded a certain defined power backoff threshold.

13. The method according to claim 9, wherein said determining further comprises determining a type of power backoff applied in a transmission time interval as being either regular or additional.

14. The method according to claim 9, wherein said determining comprises determining whether power backoff has been applied due to power management, in addition to determining whether power backoff has been applied for maximum power reduction (MPR) and additional MPR (A-MPR).

15. The method according to claim 9, wherein said receiving comprises receiving the power headroom report in an extended power headroom medium access control element or in a power headroom medium access control element.

16. The method according to claim 15, wherein, if power backoff has been applied by the user equipment due to power management, receiving an indication of said application in the extended power headroom medium access control element, the power headroom medium access control element, or a medium access control subheader used by the extended power headroom medium access control element.

17. A user equipment configured to send power headroom reports to a radio base station, for power management in a telecommunications system, the user equipment comprising:
a processing unit configured to decide whether to apply power backoff due to power management, and, in accordance with that decision, to indicate in a power headroom report whether power backoff has been applied due to power management, wherein the processing unit is configured to indicate that power backoff has been applied due to power management, if power backoff has been applied and the power backoff impacts the actual transmission power utilized by the user equipment; and a transceiver configured to send the power headroom report to the radio base station.

18. The user equipment according to claim 17, wherein the processing unit is configured to indicate in the power headroom report a maximum transmit power used by the user equipment for a serving cell.

19. The user equipment according to claim 17, wherein the transceiver is configured to send the power headroom report in an extended power headroom medium access control element or a power headroom medium access control element, and to provide an indication of whether power backoff has been applied due to power management in either the extended power headroom medium access control element, the power headroom medium access control element, or a medium access control subheader used by the extended power headroom medium access control element.

20. The user equipment according to claim 17, wherein the processing unit is configured to indicate in the power headroom report a type of power backoff applied in a transmission time interval as being either regular or additional.

21. The user equipment according to claim 17, wherein the processing unit is configured to set a reserved bit in the power headroom report to a predefined value when the processing unit decides to apply power backoff due to power management.

22. The user equipment according to claim 21, wherein the processing unit is further configured to indicate in the power headroom report that applied power backoff due to power management has exceeded a certain defined power backoff threshold, by setting a further bit in the power headroom report to a predefined value.

23. The user equipment according to claim 17, wherein the processing unit is further configured to indicate whether power backoff has been applied due to power management each time a maximum transmit power used by the user equipment is indicated in the power headroom report.

24. The user equipment according to claim 17, wherein the processing unit is further configured to indicate whether power backoff has been applied due to power management, in addition to indicating whether power backoff has been applied for maximum power reduction (MPR) and additional MPR (A-MPR).

25. A radio base station in a telecommunications system, the radio base station comprising:

a transceiver configured to receive a power headroom report from a user equipment; and a processing unit configured to determine from the received power headroom report whether power backoff has been applied by the user equipment due to power management, wherein the processing unit is configured to determine that power backoff has been applied due to power management, if power backoff has been applied and the power backoff impacts the actual transmission power utilized by the user equipment.

26. The radio base station according to claim 25, wherein the processing unit is configured to determine from the power headroom report a maximum transmit power used by the user equipment for a serving cell.

27. The radio base station according to claim 25, wherein the processing unit is configured to determine whether power backoff has been applied due to power management by determining whether a reserved bit in the power headroom report is set to a predefined value.

28. The radio base station according to claim 27, wherein the processing unit is further configured to determine whether a further reserved bit in the power headroom report is set to a predefined value indicating that applied power backoff due to power management has exceeded a certain defined power backoff threshold.

29. The radio base station according to claim 25, wherein the processing unit is further configured to determine a type of power backoff applied in a transmission time interval as being either regular or additional.

30. The radio base station according to claim 25, wherein the processing unit is further configured to determine whether power backoff has been applied due to power management, in addition to determining whether power backoff has been applied for maximum power reduction (MPR) and additional MPR (A-MPR).

31. The radio base station according to claim 25, wherein the transceiver is configured to receive the power headroom report in an extended power headroom medium access control element or in a power headroom medium access control element.

32. The radio base station according to claim 31, wherein if power backoff has been applied by the user equipment due to power management, the transceiver is configured to receive an indication of such application in the extended power headroom medium access control element, the power headroom medium access control element, or a medium access control subheader used by the extended power headroom medium access control element.

* * * * *